(12) United States Patent
Niwa et al.

(10) Patent No.: US 7,399,087 B2
(45) Date of Patent: Jul. 15, 2008

(54) SEGMENT TYPE COLOR WHEEL AND MANUFACTURING METHOD OF SAME

(75) Inventors: Shinichi Niwa, Fukuroi (JP); Kuniyuki Takao, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 58 days.

(21) Appl. No.: 11/262,733

(22) Filed: Nov. 1, 2005

(65) Prior Publication Data
US 2006/0119801 A1 Jun. 8, 2006

(30) Foreign Application Priority Data
Dec. 6, 2004 (JP) ............................. 2004-352524

(51) Int. Cl.
G03B 21/14 (2006.01)
H04N 9/12 (2006.01)
G02B 5/22 (2006.01)
G02B 7/00 (2006.01)
F21V 8/00 (2006.01)

(52) U.S. Cl. ........................ 353/84; 353/31; 348/743; 359/889; 359/891; 359/892; 362/293

(58) Field of Classification Search ................. 353/81, 353/31; 348/739, 742, 743; 359/618, 629, 359/634, 891; 362/293
See application file for complete search history.

(56) References Cited

U.S. PATENT DOCUMENTS

| 4,800,474 | A | 1/1989 | Bornhorst | 362/293 |
|---|---|---|---|---|
| 5,257,332 | A | 10/1993 | Pimpinella | 385/59 |
| 5,868,482 | A | 2/1999 | Edlinger et al. | 353/84 |
| 6,011,662 | A | 1/2000 | Evans | 359/891 |
| 6,024,453 | A | 2/2000 | Edlinger et al. | 353/84 |
| 6,574,046 | B1 | 6/2003 | Shioya | 359/618 |
| 6,702,446 | B2 | 3/2004 | De Vaan et al. | 353/84 |
| 6,715,887 | B2 | 4/2004 | Chang | 353/84 |
| 6,813,087 | B2 | 11/2004 | Davis | 359/634 |
| 2002/0005914 | A1 | 1/2002 | Tew | 348/743 |
| 2002/0105729 | A1 | 8/2002 | Richards et al. | 359/634 |
| 2003/0142241 | A1 | 7/2003 | Allen et al. | 348/742 |
| 2004/0095767 | A1 | 5/2004 | Ohmae et al. | 362/293 |
| 2005/0018145 | A1 | 1/2005 | Kwon et al. | 353/84 |

FOREIGN PATENT DOCUMENTS

JP  A 3-122903  5/1991

(Continued)

*Primary Examiner*—Rochelle-Ann Blackman
(74) *Attorney, Agent, or Firm*—Oliff & Berridge, PLC (57) ABSTRACT

A color wheel includes a plurality of color filter segments disposed so as to form a disk configuration, and a support member to fixedly set the plurality of color filter segments in place. Each of the color filter segments has a circular outer circumference, an inner circumference measuring shorter than the outer circumference, and two sides each connecting between the outer circumference and the inner circumference. In the color wheel described above, a chamfer is provided at the innermost portion of at least one of the two sides. The chamfer provides a clearance between opposing sides of any two adjacent color filter segments, so as to house burrs that are often formed at the sides, and therefore the opposing sides are fitted closely to each other even when burrs are formed at the sides. Consequently, spokes generated between two adjacent color filter segments can be minimized.

9 Claims, 7 Drawing Sheets

FOREIGN PATENT DOCUMENTS

| | | |
|---|---|---|
| JP | A 5-90391 | 4/1993 |
| JP | A 6-347639 | 12/1994 |
| JP | A 10-48542 | 2/1998 |
| JP | A 11-115711 | 4/1999 |
| JP | A 11-222664 | 8/1999 |
| JP | A 2000-239830 | 9/2000 |
| JP | A 2001-73136 | 3/2001 |
| JP | A 2003-50309 | 2/2003 |
| JP | A 2003-57424 | 2/2003 |
| JP | A 2004-101827 | 4/2004 |
| WO | WO 94/25796 | 11/1994 |

SEGMENT TYPE COLOR WHEEL AND MANUFACTURING METHOD OF SAME

BACKGROUND OF THE INVENTION

1. Field of the Invention

The present invention relates to a segment type color wheel suitable as a filter element of a time-share light dispersing device, and to a manufacturing method of the same.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into red (R), green (G), and blue (B) lights; and a three-panel method, in which three light valve elements dedicated to R, G and B lights, respectively, are used to produce R, G and B images in parallel, and then the three images thus produced are combined. Currently, as a light valve element capable of fast switching, such as a ferroelectric liquid crystal display element or a digital micro mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

Figure 6A:
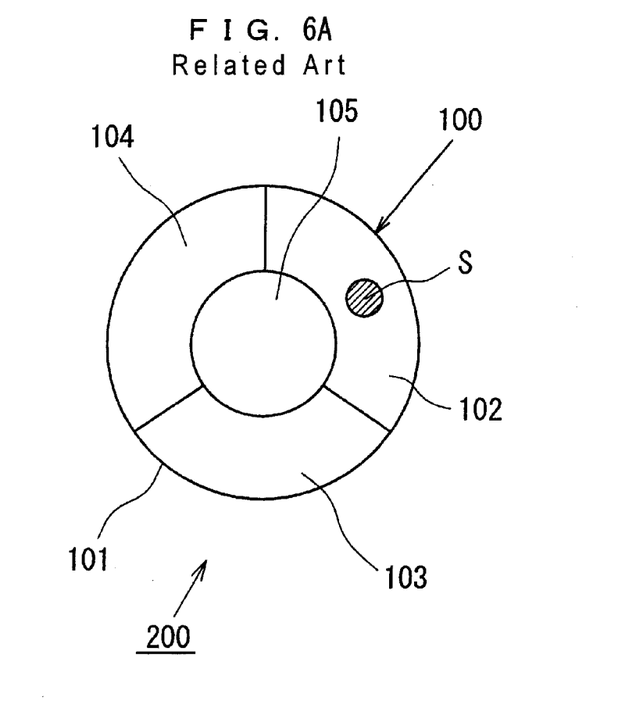
FIG. 6A is a top plan view of a conventional color wheel assembly.
Figure 6B:
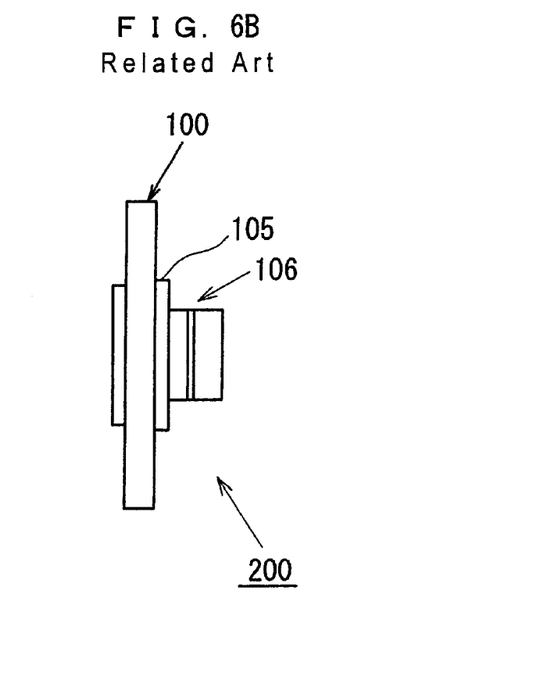
FIG. 6B is a side view of the color wheel assembly of FIG. 6A.

FIGS. 6A and 6B are respectively top plan and side views of a conventional and typical color wheel assembly 200 as a time-share light dispersing device including such a color wheel as described above. Referring to FIG. 6B, the color wheel assembly 200 includes a color wheel 100, and a driving motor 106 including a motor hub 105. The color wheel 100 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which exclusively transmit, for example, R, G and B lights, respectively. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

Figure 7:
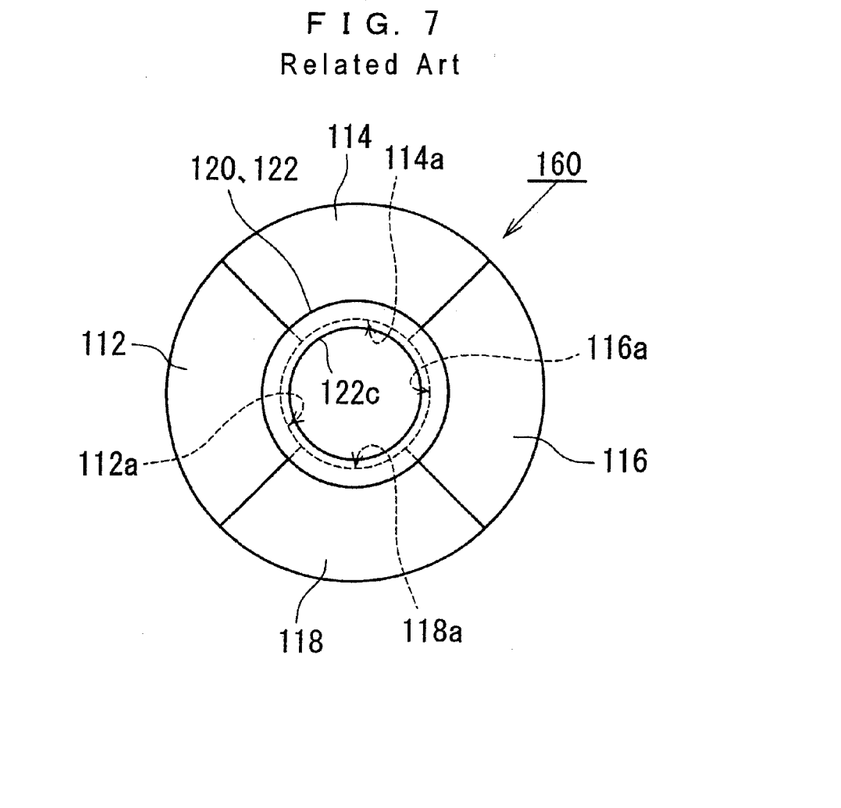
FIG. 7 is a top plan view of a conventional segment type color wheel.
Figure 8:
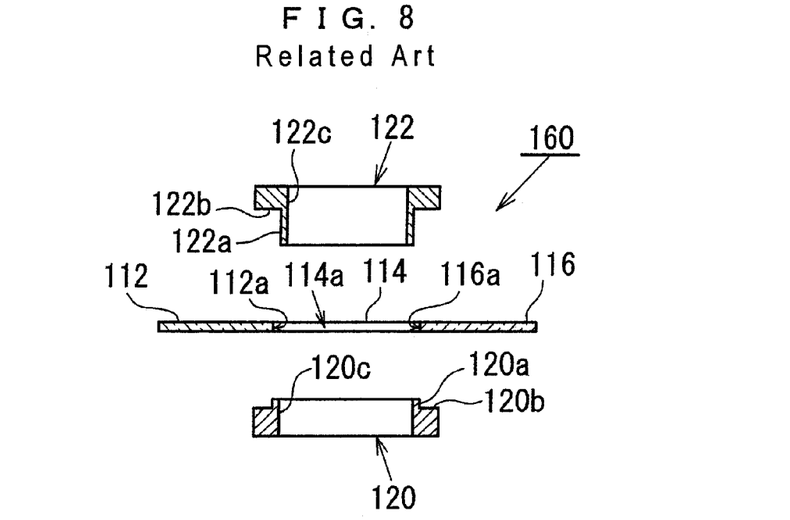
FIG. 8 is an exploded side cross sectional view of the segment type color wheel of FIG. 7.

FIGS. 7 and 8 are respectively top plan and exploded side sectional views of a segment type color wheel 160, which is structured such that a plurality (four in FIG. 7) of pie-shaped color filter segments 112, 114, 116 and 118 separately prepared are fixed in position by means of a support member 120 and a clamp member 122 so as to form a disk.

Specifically, as shown in FIG. 8, inner circumferences 112a, 114a, 116a and 118a of the color filter segments 112, 114, 116 and 118 are fitted to an outer circumference of a smaller cylinder portion 120a of the support member 120 whereby the color filter segments 112, 114, 116 and 118 are duly set in position in the radial direction of the color wheel 160, and surfaces thereof located toward the inner circumferences 112a, 114a, 116a and 118a are fitted to an annular seat portion 120b of the support member 120 whereby the color filter segments 112, 114, 116 and 118 are duly set in position in the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the color filter segments 112, 114, 116 and 118. And, when the support member 120 and the clamp member 122 are bonded or screwed together, the color filter segments 112, 114, 116 and 118 are fixed as one piece structure. The color wheel 160 thus structured is fixedly attached to a hub (such as the hub 105 as shown in FIGS. 6A and 6B) of a motor (such as the driving motor 106 as shown FIG. 6B) such that the hub is inserted in the hollow 122c of the clamp member 122 constituting the color wheel 160 (refer to, for example, paragraph [0010] and FIG. 6 in Japanese Patent Application Laid-Open No. 2004-101827, and claim 1 and FIG. 2 of Japanese Patent Application Laid-Open No. H10-48542).

Figure 9:
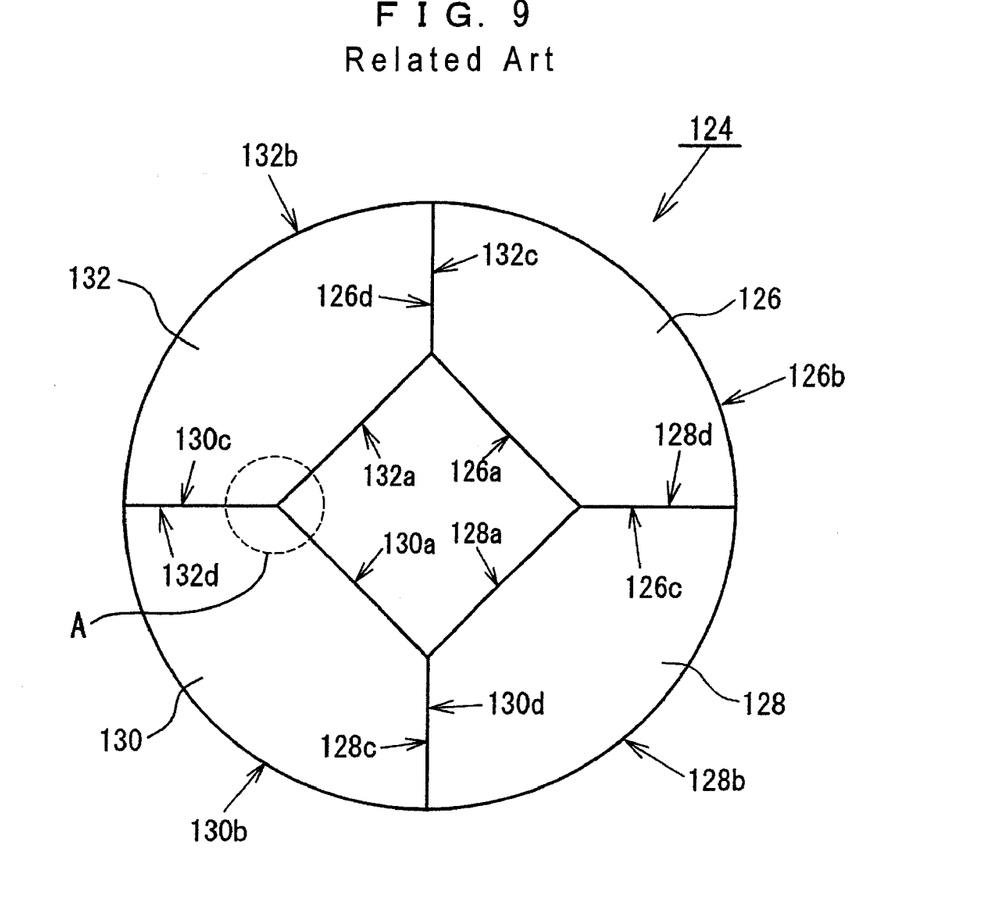
FIG. 9 is a top plan view of another conventional segment type color wheel.

FIG. 9 is a top plan view of another segment type color wheel 124 including color filter segments 126, 128, 130 and 132. The color filter segments 126, 128, 130 and 132 have respective inner circumferences 126a, 128a, 130a and 132a, which are not subjected to optical characteristic constraints, and which are formed straight as shown in the figure (or alternatively circular with a small curvature), whereby the workability is improved enabling cost reduction in production. Recently, cost reduction by such a method is increasingly requested along with downsizing of a color wheel. The color filter segments 126, 128, 130 and 132 further have respective outer circumferences 126b, 128b, 130b and 132b, and both sides 126c/126d, 128c/128d, 130c/130d and 132c/132d which meet respectively with the outer circumferences 126b, 128b, 130b and 132b at a right angle, and which meet respectively with the inner circumferences 126a, 128a, 130a and 132a at an angle greater than 90 degrees.

Figure 10A:
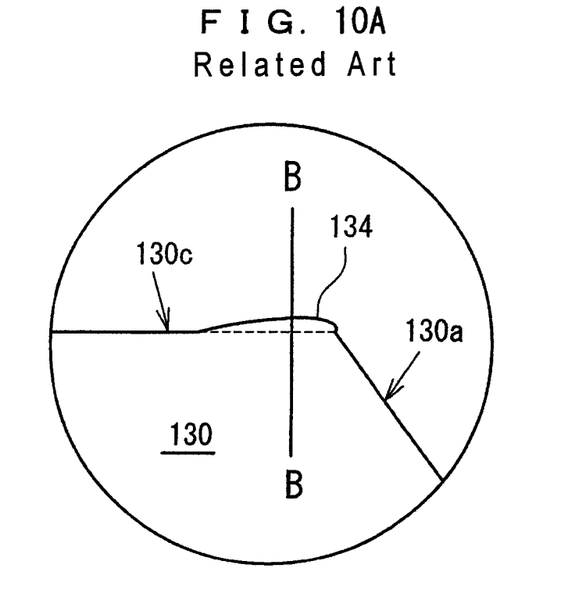
FIG. 10A is an enlarge view of a portion of the segment type color wheel of FIG. 9, indicated by A.
Figure 10B:
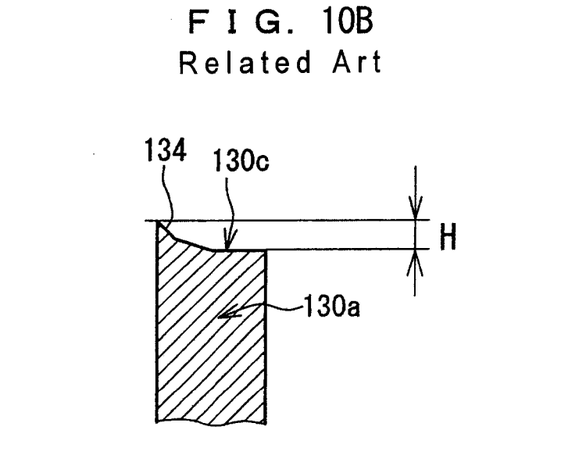
FIG. 10B is a cross sectional view of one color filter segment of FIG. 10A, taken along line B-B.

When a color filter segment is carved out of a glass substrate scribed by a scriber, burrs may be unwantedly formed. Referring to FIG. 10A showing an enlarged view of a part of the color filter segment 130, indicated by A in FIG. 9, and also to FIG. 10B showing a cross sectional view of the color filter segment 130, taken along line B-B in FIG. 10A, a burr 134 is formed at the side 130c of the color filter segment 130. The burr 134 thus formed has a dimension H normally measuring several hundreds of micron meters, and causes a gap (spoke) to be formed between the side 130c of the color filter segment 130 and the side 132d of the color filter segment 132, which, in the worst case, prohibits assembly of the color wheel 124. Since the increase of the spoke width generally causes the light utilization to lower, the color purity to deteriorate, and the wind noise to increase, the spoke dimension needs to be minimized.

It is verified by the present inventors et al. that, for example in case of the color filter segment 130, such a burr is often formed at innermost end portions of the sides 130c and 130d intersecting with the inner circumference 130a at an angle larger than 90 degrees, and therefore the processes of inspecting and removing burrs are definitely required, which inevitably increases the number of manufacturing processes thus pushing up production cost.

SUMMARY OF THE INVENTION

The present invention has been made in the light of the above problem, and it is an object of the present invention to provide a segment type color wheel, in which a spoke generated between adjacent color filter segments is minimized in dimension without increase in production cost.

In order to achieve the object described above, according to a first aspect of the present invention, a color wheel is provided, which includes: a plurality of color filter segments disposed so as to form a disk configuration, each of the color filter segments including an outer circumference configured circular, an inner circumference having a shorter dimension than the outer circumference, and two sides each connecting between the outer circumference and the inner circumference, wherein a chamfer is provided at the innermost portion of at least one of the two sides; and a support member to fixedly set the plurality of color filter segments in place. The chamfer thus provided generates a clearance between opposing sides of any two adjacent color filter segments, so as to house burrs that are often formed at the sides, and therefore the opposing sides are fitted closely to each other even when burrs are formed at the sides. Consequently, spokes generated between two adjacent color filter segments can be minimized.

In the first aspect of the present invention, the inner circumference may be straight, or alternatively be circular such that the center point of a circle defined by the inner circumference of each color filter segment is located farther from the color filter segment than the center point of a circle defined by the outer circumference of the color filter segment. In whichever case, the inner circumference can be processed with enhanced workability.

In the first aspect of the present invention, the chamfer may be located in an area covered by the support member. Consequently, the chamfer does not disturb the operative area of the color wheel, thus having no impact on the light utilization ratio and the color purity at all.

According to a second aspect of the present invention, there is provided a method of manufacturing a color wheel which includes a plurality of color filter segments disposed so as to form a disk configuration, and a support member to fixedly set the plurality of color filter segments in place. The method includes the steps of processing each of the color filter segments so as to include an outer circumference configured circular, an inner circumference having a shorter dimension than the outer circumference, and two sides each connecting between the outer circumference and the inner circumference; and forming a chamfer at the innermost portion of at least one of the two sides. The chamfer thus formed generates a clearance between opposing sides of any two adjacent color filter segments, so as to house burrs that are often formed at the sides, and therefore the opposing sides are fitted closely to each other even when burrs are formed at the sides. Consequently, spokes generated between two adjacent color filter segments can be minimized.

In the second aspect of the present invention, the inner circumference may be shaped straight, or alternatively circular such that a center point of a circle defined by the inner circumference of each color filter segment is located farther from the color filter segment than a center point of a circle defined by the outer circumference of the color filter segment. In whichever case, the inner circumference can be processed with enhanced workability.

In the second aspect of the present invention, the chamfer may be formed to be located in an area covered by the support member. Consequently, the chamfer does not disturb the operative area of the color wheel, thus having no impact on the light utilization ration and the color purity at all.

Accordingly, a segment type color wheel can be provided, in which spokes formed between two adjacent color filter segments are minimized thus enhancing the quality without production cost increase.

DETAILED DESCRIPTION OF THE PREFERRED EMBODIMENTS

Preferred embodiments of the present invention will hereinafter be described with reference to the accompanying drawings.

Figure 1:
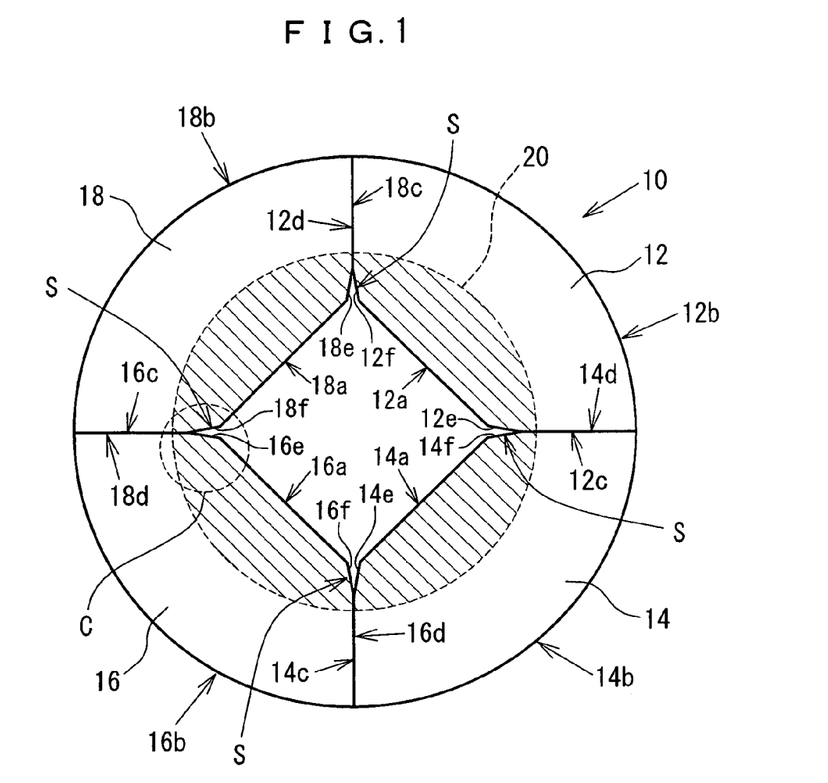
FIG. 1 is a top plan view of a segment type color wheel according to a first embodiment of the present invention.

A first embodiment of the present invention will be described with reference to FIGS. 1 and 2. Referring to FIG. 1, a segment type color wheel 10 according to the first embodiment includes a plurality (four in the present embodiment) of color filter segments 12, 14, 16 and 18, and a support member 20. The color filter segments 12, 14, 16 and 18 have respective outer circumferences 12*b*, 14*b*, 16*b* and 18*b* defined circular, respective inner circumferences 12*a*, 14*a*, 16*a* and 18*a* measuring shorter than the respective outer circumferences 12*b*, 14*b*, 16*b* and 18*b*, and respective both sides 12*c*/12*d*, 14*c*/14*s*, 16*c*/16*d* and 18*c*/18*d* each connecting between the outer circumference and the inner circumference, and are fixedly set in place by means of the support member 20 so as to form a disk in combination, such that the support member 20 covers the shaded areas of the color filter segments 12, 14, 16 and 18.

In FIG. 1, the inner circumferences 12*a*, 14*a*, 16*a* and 18*a* are straight, the sides 12*c*/12*d*, 14*c*/14*d*, 16*c*/16*d* and 18*c*/18*d* are straight for the most part, and extensions of the straight sides 12*c*/12*d*, 14*c*/14*d*, 16*c*/16*d* and 18*c*/18*d* go through the center point of a circle formed by the circular outer circumferences 12*b*, 14*b*, 16*b* and 18*b*. Chamfers 12*e* and 12*f* are formed respectively at portions of the sides 12*c* and 12*d* located close to the inner circumference 112*a*, and chamfers 14*e*/14*f*, 16*e*/16*f* and 18*e*/18*f* are formed at portions of the sides 14*c*/14*d*, 16*c*/16*d* and 18*c*/18*d* in the same way, so that clearances S are provided between interfacing sides of any two adjacent color filer segments toward the inner circumferences. The clearances S thus provided are included in the aforementioned shaded areas of the color filter segments 12, 14, 16 and 18.

Figure 2:
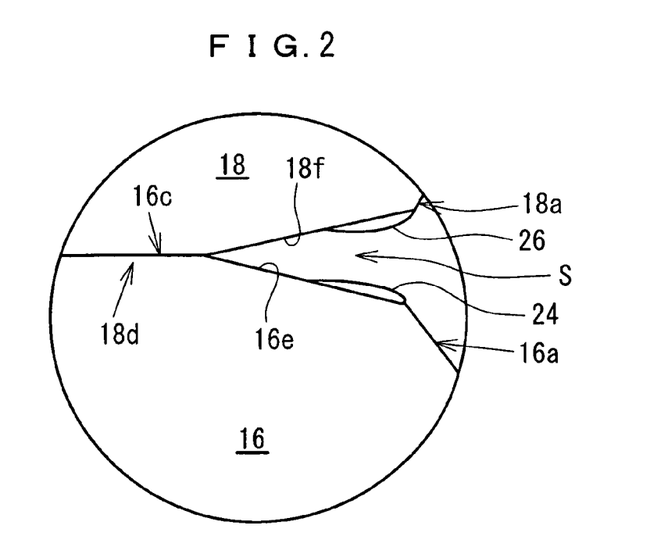
FIG. 2 is an enlarged view of a portion of the segment type color wheel of FIG. 1, indicated by C.

Referring to FIG. 2 showing an enlarged view of a portion indicated by C in FIG. 1, since the chamfers 16*f* and 18*e* meet with the inner circumferences 16*a* and 18*a*, respectively, at an angle greater than 90 degrees, burrs 24 and 26 are possibly formed at portions of the chamfers 16*e* and 18*f* located close to the inner circumferences 16*a* and 18*a*. The burrs 24 and 26, however, are prevented from interfering with each other or any parts of the opposing color filter segment due to the existence of the clearance S, and therefore the side 16c of the color filter segment 16 and the side 18d of the color filter segment 18 are allowed to be fitted closely to each other, which results in minimizing the spoke dimension. The clearance S adapted to contain the burrs 24 and 26 is included in the shaded areas covered by the support member 20 as described above, and does not disturb the operative area (which a white light transmits) of the color wheel 10. Consequently, the light utilization ratio and the color purity are not influenced at all.

Thus, since the segment type color wheel 10 according to the first embodiment allows spokes generated between two adjacent color filter segments to be minimized while eliminating the necessity of inspecting and removing burrs, the quality of a segment type color wheel can be improved without inviting production cost increase.

Figure 3:
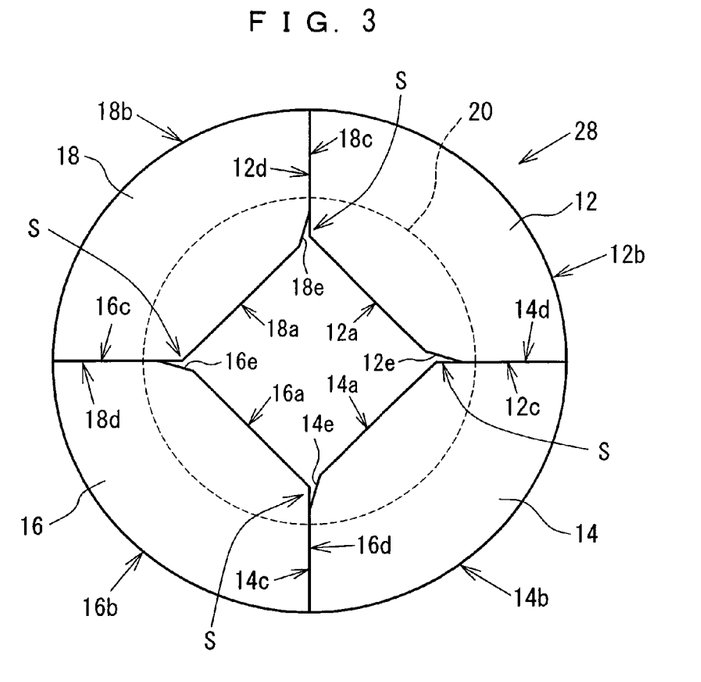
FIG. 3 is a top plan view of a segment type color wheel according to a second embodiment of the present invention.

A second embodiment of the present invention will be described with reference to FIG. 3. In a segment type color wheel 28 according to the second embodiment, each of color filter segments 12, 14, 16 and 18 is provided with only one chamfer. Specifically, for example, a chamfer 12e is formed at a side 12c of the color filter segment 12 while no chamfer is formed at a side 12d. The filter segments 14, 16 and 18 are structured in the same way with clearances S duly provided. The clearances S thus provided have the same effect as the clearances S in the first embodiment, and the segment type color wheel 28 structured as described above achieves the same advantage.

Figure 4:
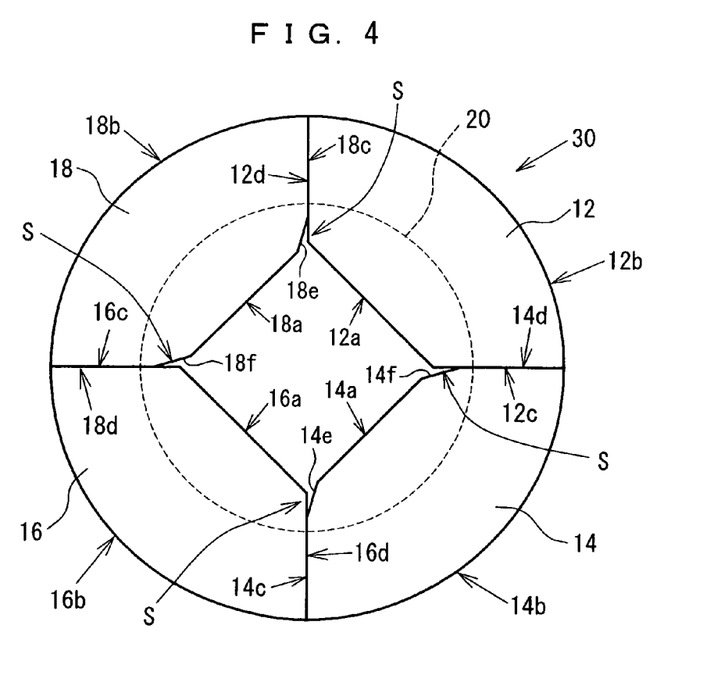
FIG. 4 is a top plan view of a segment type color wheel according to a third embodiment of the present invention.

A third embodiment of the present invention will be described with reference to FIG. 4. In a segment type color wheel 30 according to the third embodiment, chamfers are not formed at all of color filter segments 12, 14, 16 and 18, but formed only at the color filter segments 14 and 18. More specifically, chamfers 14e and 14f are formed respectively at sides 14c and 14d of the color filter segment 14, and chamfers 18e and 18f are respectively formed at sides 18c and 18d of the color filter segments 18 while no chamfers are formed at any sides of the color filter segments 12 and 16, wherein clearances S are duly provided. In case of a segment type color wheel with a minimum number of three color filter segments, chamfers are formed at two of the three color filter segments. The clearances S thus provided have the same effect as the clearances S in the first embodiment, and the segment type color wheel 30 achieves the same advantage.

In the first to third embodiments described above of the present invention, the chamfers are so configured and dimensioned that the clearances provided duly house burrs and are covered by the support member.

Figure 5:
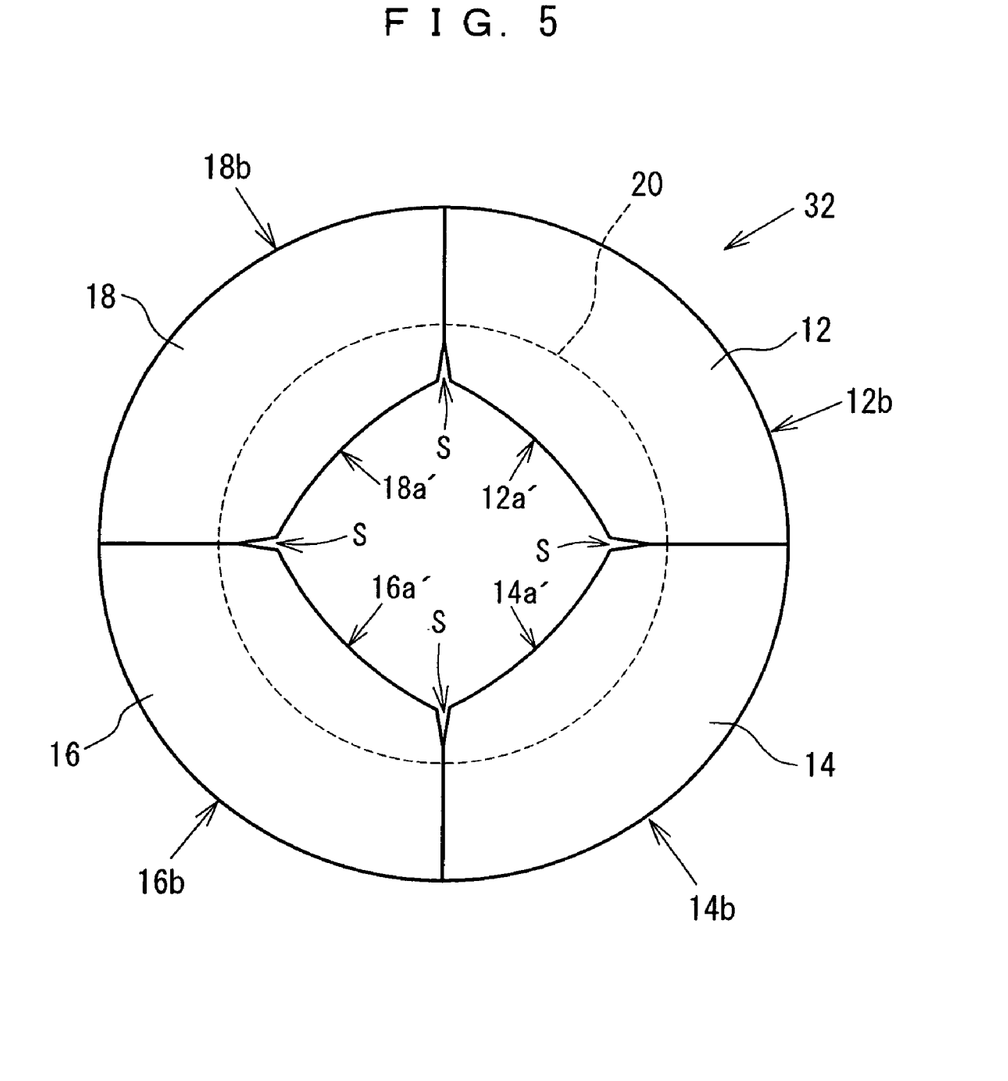
FIG. 5 is a top plan view of a segment type color wheel according to a fourth embodiment of the present invention.

Further, a fourth embodiment of the present invention will be described with reference to FIG. 5. A segment type color wheel 32 according to the fourth embodiment differs from the segment type color wheel 10 in FIG. 1 according to the first embodiment in configuration of inner circumferences of a color filter segment. Specifically, color filter segments 12, 14, 16 and 18 of the segment type color wheel 32 have respective inner circumferences 12a', 14a', 16a' and 18a' which are circular, while the inner circumferences 12a, 14a, 16a and 18a of the color filter segments 12, 14 16 and 18 are straight in the segment type color wheel 10. The center point of a circle formed by, for example, the inner circumference 12a' is located farther from the color filter segment 12 than the center point of a circle formed by an outer circumference 12b of the color filter segment 12. In the segment type color wheel 32, clearances S are duly provided, and the same advantage as in the segment type color wheel 10 is achieved.

It is evident that the present invention can be applied not only to the process of scribing color filter segments, but also to any process in which burrs projecting outward are possibly formed at color filter segments.

Obviously, many modifications and variations of the present invention are possible in the light of the above teachings. Thus, it is to be understood that, within the scope of the appended claims, the present invention may be practiced otherwise than as specifically described above.

What is claimed is:

1. A color wheel comprising:
  a plurality of color filter segments disposed so as to form a disk configuration, each of the color filter segments including an outer circumference configured circular, an inner circumference having a shorter dimension than the outer circumference, and two sides of the color filter segments each connecting between the outer circumference and the inner circumference, wherein a chamfer is provided at an innermost portion of at least one of the two sides of the color filter segments, the chamfer attaching to the inner circumference; and
  a support member to fixedly set the plurality of color filter segments in place.

2. A color wheel according to claim 1, wherein the inner circumference is straight.

3. A color wheel according to claim 2, wherein the chamfer is located in an area covered by the support member.

4. A color wheel according to claim 1, wherein the inner circumference is circular such that a center point of a circle defined by the inner circumference of each color filter segment is located farther from the color filter segment than a center point of a circle defined by the outer circumference of the color filter segment.

5. A color wheel according to claim 4, wherein the chamfer is located in an area covered by the support member.

6. A color wheel according to claim 1, wherein the chamfer is located in an area covered by the support member.

7. A method of manufacturing a color wheel comprising a plurality of color filter segments disposed so as to form a disk configuration, and a support member to fixedly set the plurality of color filter segments in place, the method comprising the steps of:
  processing each of the color filter segments so as to include an outer circumference configured circular, an inner circumference having a shorter dimension than the outer circumference, and two sides each connecting between the outer circumference and the inner circumference; and
  forming a chamfer at an innermost portion of at least one of the two sides, the chamfer attaching to attach to the inner circumference; and
  covering the chamfer with the support member.

8. A method of manufacturing a color wheel according to claim 7, wherein the inner circumference is shaped straight.

9. A method of manufacturing a color wheel according to claim 7, wherein the inner circumference is shaped circular such that a center point of a circle defined by the inner circumference of each color filter segment is located farther from the color filter segment than a center point of a circle defined by the outer circumference of the color filter segment.

* * * * *